M. F. MACDONALD.
LOCK FOR AUTOMOBILES.
APPLICATION FILED FEB. 21, 1920. RENEWED DEC. 6, 1921.

1,404,037. Patented Jan. 17, 1922.

Inventor
Maynard F. Macdonald
By E. C. Brandenburg
his Attorney

UNITED STATES PATENT OFFICE.

MAYNARD FORBES MACDONALD, OF VICTORIA, BRITISH COLUMBIA, CANADA.

LOCK FOR AUTOMOBILES.

1,404,037.

Specification of Letters Patent.   Patented Jan. 17, 1922.

Application filed February 21, 1920, Serial No. 360,333. Renewed December 6, 1921. Serial No. 520,401.

*To all whom it may concern:*

Be it known that I, MAYNARD F. MACDONALD, a citizen of the United States of America, residing at Victoria, Province of British Columbia, Canada, have invented certain new and useful Improvements in Locks for Automobiles, of which the following is a specification.

My invention relates to an improvement in locks for automobiles.

The object of this invention is to provide a simple means for quickly locking the steering gear and controls of an automobile so that an unauthorized person cannot use the machine. With the foregoing object in view this invention consists in a shank which is constructed and adapted to straddle and enclose one of the spokes of the steering wheel and also, if desired, the quadrant, and control levers, or any of them, and be locked into a lock which may be built into the steering column in manufacture, as an integral part of the steering column or which may lock into a clamp which is made in two parts adapted to embrace and be secured to the steering column; the said shank to be locked in holes in the clamp or the lock as the case may be, from which it can only be released by a person having a key which fits the lock, and the position of the shank is such that it precludes access to the means for securing the clamp to the steering column while at the same time it prevents the removal of the means which secures the two parts of the clamp together; in other words, the shank is so constructed and arranged and located with respect to the means for securing the parts of the clamp together on the steering column and the means for fastening the clamp as a whole, to the steering column, that it precludes the removal of the lock from the machine while the shank is in locked position in the clamp.

Figure 1:
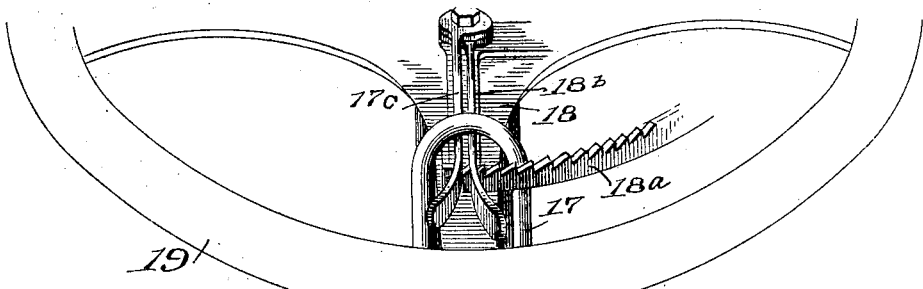
Figure 3:
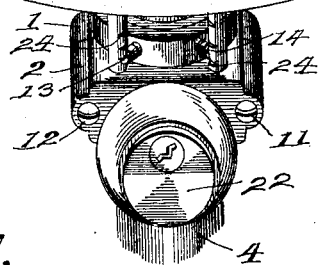
Figure 2:
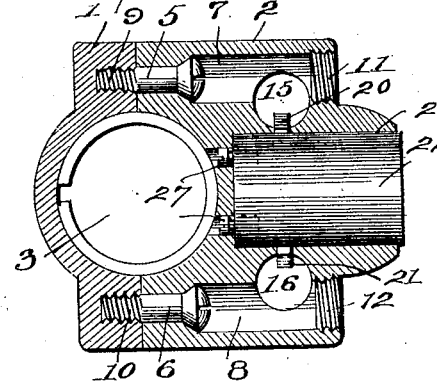
Figure 4:
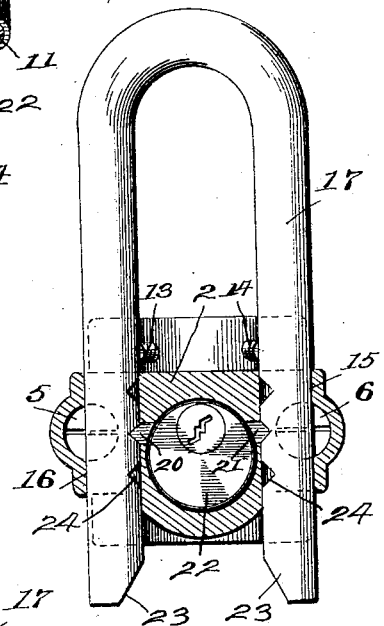
Figure 4:
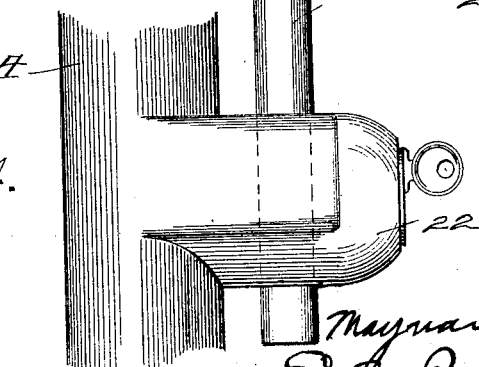

In the accompanying drawings, Figure 1 is a view in perspective showing my improved lock applied to the steering gear of an automobile; Figure 2 is a horizontal section; Figure 3 is a vertical section through the locking mechanism, including the shank; and Figure 4 is a side elevation of a modified form of the device forming an integral part of the steering column.

The numerals 1 and 2 represent the two sections of the clamp which together have an orifice 3, one half in each section adapted to fit and embrace the steering column 4. These sections, 1 and 2, are fastened together around the column by means of two screws, 5 and 6, which extend through the holes 7 and 8, respectively, in the section 2 and screw into the threaded holes 9 and 10 respectively, in the section 1 of the clamp. These screws 5 and 6, are relatively short and do not extend throughout the whole length of the holes 7 and 8 for a reason which will be hereinafter explained.

The outer ends of the holes 7 and 8 are threaded and short screw plugs 11 and 12 are adapted to screw therein in order to close the holes 7 and 8.

The clamp is fastened on the steering column through the agency of the screws 5 and 6 above described, but to provide for bushings so as to enable the clamp to be readily adjusted to the different sizes of steering columns two set screws 13 and 14 are provided for in the hub of the clamp and these set screws extend radially in the direction of the two holes 15 and 16, which latter holes transversely intersect the outer ends of the holes 7 and 8 extending fully half way into the latter and these holes 15 and 16 are constructed and adapted to receive the U-shaped shank 17. This shank 17 is made to straddle a spoke 18, the quadrant 18ª, the control levers 18ᵇ and 17ᶜ or any of them, of the steering wheel 19, whereupon the ends of the shank are inserted in the two holes 15 and 16 wherein the ends are locked by means of the spring actuated wards 20 and 21, of the lock 22, these wards normally extending yieldably in opposite directions from the centre, outwardly into the two holes 15 and 16, and the shank is slightly bevelled as at 23 at the inner corners of its ends in order to force these wards temporarily aside out of the path of the shank through the holes 15 and 16, and back from the ends of the shank a little distance the notches 24 are formed in their inner sides to receive the wards whereby the shank is locked to the clamp and the steering wheel in turn is locked against movement in either direction. There are a plurality of these notches 24 in order to accommodate the parts of the lock to the varying conditions of different makes of automobiles. The holes 15 and 16 in the clamp extend through the clamp so as to enable the shank 17 to be inserted from the reverse side as a convenient means of carrying the same when not in use.

The outer end of the section 2 of the clamp is horizontally counterbored, as at 25, to receive the barrel 22, of the pin or other lock, and the latter is removably held in place in the bore 25 by means of two set screws 27 from the inside.

From the foregoing it will be seen that the shank is so placed that it precludes, when in operative position, the possibility of the sections of the clamp being tampered with and separated for the reason that the shank closes the holes 15 and 16 when in position, thus preventing the insertion of a screwdriver or other tool by which the screws 5 and 6 can be removed by any unauthorized person. At the same time the ends of the shank are immediately back of the two set screws 13 and 14, so that the latter cannot be removed from the steering column while the shank is in position.

In this way a thief-proof lock is provided which is simple in its parts, strong in construction, easily applied and removed by an authorized person and equally difficult of removal by clandestine means, thus affording an effective device for the accomplishment of its purposes.

I claim:

1. A lock for automobiles including a two-part clamp having holes therein, a notched shank adapted to be inserted in said holes, a lock for fastening said shank to the clamp, means for fastening the parts of the clamp together, separate means for fastening the clamp as a whole on a part of the steering gear on the automobile, comprising set screws adapted to bear on the steering column of said automobile, both of said means being protected against movement by the shank when in its locked position.

2. A lock for automobiles including a two-part clamp, a shank insertable in part of said clamp, a lock for fastening the shank to the clamp, means for fastening the parts of the clamp together, separate means for adjustably fastening the clamp as a whole to a part of the steering-gear of an automobile, both of said means being protected against movement by the shank when in its locked position.

In testimony whereof I affix my signature.

MAYNARD FORBES MACDONALD.